Dec. 3, 1968 A. B. SPERRY 3,414,731
PACKAGE CLASSIFICATION BY TRACKING THE PATH OF A CIRCULAR
LABEL AND SIMULTANEOUSLY SCANNING THE
INFORMATION ON THE LABEL
Filed Oct. 28, 1966 3 Sheets-Sheet 1

INVENTOR.
ARTHUR B. SPERRY
BY
ATTORNEY

INVENTOR.
ARTHUR B. SPERRY

ATTORNEY

Dec. 3, 1968 A. B. SPERRY 3,414,731
PACKAGE CLASSIFICATION BY TRACKING THE PATH OF A CIRCULAR
LABEL AND SIMULTANEOUSLY SCANNING THE
INFORMATION ON THE LABEL
Filed Oct. 28, 1966 3 Sheets-Sheet 3

INVENTOR.
ARTHUR B. SPERRY
BY
*Stanley M. Schwyzer*
ATTORNEY

United States Patent Office 3,414,731
Patented Dec. 3, 1968

3,414,731
PACKAGE CLASSIFICATION BY TRACKING THE PATH OF A CIRCULAR LABEL AND SIMULTANEOUSLY SCANNING THE INFORMATION ON THE LABEL
Arthur B. Sperry, Weston, Mass., assignor to Sylvania Electric Products Inc., a corporation of Delaware
Filed Oct. 28, 1966, Ser. No. 590,297
7 Claims. (Cl. 250—219)

This invention relates to mark sensing systems and particularly to systems for reading circularly disposed coded data.

Various mark sensing systems are presently employed for automatically reading checks, sorting mail and identifying moving railway cars and have reached the point of commercial practicality. A commercially attractive system for merchandise check-out, inventory control, and the like has not, however, been demonstrated heretofore, although many such systems have been suggested. These previously suggested systems have not been commercially feasible by reason of awkward label configurations and codes, complex reading means and the attendant disadvantages of unreliability and high cost.

In order to be commercially attractive, an automatic label reading system for use in merchandise check-out and control, for example, automated check-out in a supermarket, must be extremely reliable and of relatively low cost, and should employ a small, easily affixed and inexpensive label containing judiciously coded information.

It has been discovered that data can be encoded in a circular format which can accommodate a variety of codes, together with timing and tracking information, in a relatively small physical area. Such circular format has the added advantage of being insensitive to orientation; that is, it can be machine readable in any orientation. In brief, information is encoded in binary form in one or more annuli by selected arrangements of two optically differentiable marks. For example, data can be represented by black marks suitably disposed in one or more annuli on a white background. Or, a fluorescent or colored material having a spectral response different than the background can be employed as code marks. This coded data can be arranged on a label or directly on items or things to be identified. As used herein, the term "label" is intended to mean any configuration of data in accordance with the present invention, and not merely a physically attachable label.

For use in a merchandise check-out system, the label containing data identifying a particular item is affixed to that item in a position to be viewed by an optical scanner, such as on the bottom of each item. Alternatively, the coded data can be printed directly on the items either at the time the package is printed or later. In any event, all items at the check-out station contain identifying coded data. Such data can represent the price of the item, the department number, store number, applicable taxes and other relevant information. Preferably, however, the coded data represents an item number uniquely identifying a particular item. The decoding system contains a memory storing the requisite information associated with each item number. To decode and read out a label, then, the item number is looked up in the memory and the corresponding data is retrieved for use in computation and display. By using item numbers, price changes of particular items do not necessitate a change of labels, rather, the new price information is merely inserted into the memory and is read out when correlated with the appropriate item number.

To read the label, the item to which it is affixed is moved across a viewing area, and the label is optically scanned to produce electrical signals representative of the data content of the label.

The invention will be more fully understood from the following detailed description, taken in conjunction with the accompanying drawings, in which.

Figure 1A:
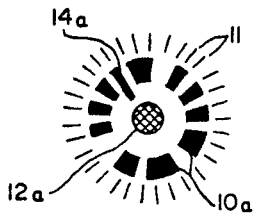
FIGS. 1A, 1B and 1C are illustrations of three label code configurations useful in the present invention.
Figure 1B:
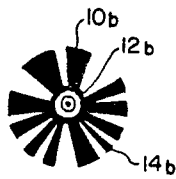
Figure 1C:
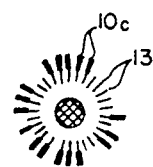

In accordance with the present invention, data is arranged in a circumferential configuration in one or more annuli, three typical data configurations being illustrated in FIGS. 1A, 1B and 1C. In FIG. 1A, data is represented by black marks 10a on a white background arranged in a single annulus, the annulus being divided into the desired number of bit positions, 30 being illustrated in the figure by the delineations 11. In the present instance, a black mark in a particular bit position represents a binary one while the absence of a mark represents a binary zero; of course, the data bits can be arranged in one of many well known code configurations to suitably represent the data, the particular code chosen depending upon the requirements of a particular system. A center dot 12a, for example, of retroreflective material, provides a target for the acquisition and tracking system, as will be explained. The data configuration illustrated in FIG. 1B is similar to that of FIG. 1A except that the data bits 10b extend radially inward to provide a greater viewing area for the optical scanner, and a bullseye pattern composed on concentric circles 12b is utilized as a tracking target. In FIG. 1C data is represented by suitably coded marks 10c in an outer annulus, while clock bits 13 are disposed in an inner annulus to provide timing information to the decoding circuitry.

The beginning of the coded sequence must be suitably indicated so that the optical scanner can determine the beginning of a data word. Some sort of start code is, therefore, necessary and can either be a particularly coded word which is part of the data sequence or a mark which is in some respect different from the data so that it may be distinguished as an indication of the beginning of the data sequence. Typically, a "start" mark can be one which extends radially beyond the data annulus, such as line 14a in FIG. 1A which extends radially inward from the data annulus, or different in circumferential width than the data, as line 14b in FIG. 1B which is circumferentially narrower than data marks 10b. In addition to a start code, data which is to be decoded electronically must have a suitable clock sequence associated with the data so that the circuitry required to decode the data can be properly timed. In general, three modes of data clocking can be employed, a master system clock which can be periodically synchronized to the label data, an adaptive clock system which continually adjusts its rate to that of the label data and a self-clocking data code which itself is operative to provide both timing and data bits in proper synchronism to the system.

In applications where a coded label is moved across a viewing area during which time it is optically scanned and decoded, the label must first be acquired by the optical system and tracked in its path across the viewing area while it is being scanned. Some portion of the label must provide a target for such acquisition and tracking. In the merchandise check-out system under discussion herein, the tracking target is provided by a dot of retroflective material located at the center of the circular label, such as dot 12a in FIG. 1A. Alternatively, the bullseye configuration of FIG. 1B can be used to provide the tracking target.

The circular data format permits acquisition and reading of the data in a variety of ways. For example, a matrix of photosensitive devices can be employed to "recognize" the pattern of a given code and provide a plurality of signals which represent the stored data. Or, one or more photosensitive devices can be positioned to sense the coded marks in each annuli, as the mark and the photosensors are rotated relative to one another.

Data can be most easily read from the label by positioning it at a predetermined reading location and causing the label and the photosensor to rotate relative to each other about the geometric center of the data. In many instances, however, it is not practical to precisely preposition the label to be read, but, rather, the label need only be located in some known area in which it is scanned and decoded. Initially, the label is acquired within the known area by the reading equipment and is then scanned to decode its data content. If the label is moving across the viewing area, the scanner must be sufficiently fast to read the label "on the fly" or the label must be tracked during the time that it is being scanned.

Figure 2:
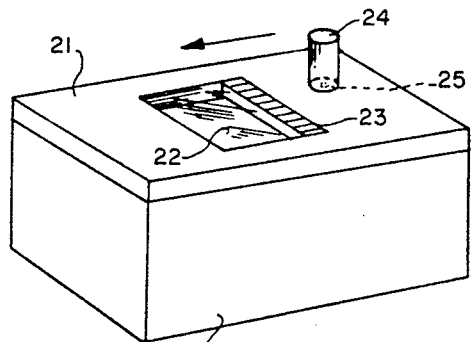
FIG. 2 is a pictorial representation of a merchandise check-out counter housing a label reading system according to the invention.

The label reading system as it is embodied in a supermarket merchandise check-out counter is illustrated in FIG. 2. The check-out counter 20 has a countertop 21 containing a rectangular opening therein which is fitted with a transparent window 22. An elongated light sensitive detector 23 is disposed across the width of window 22 adjacent to the side of the window where items of merchandise enter. The tracking and scanning circuitry is located beneath window 22 within the counter and its operation will be explained in detail hereinafter. To identify a particular item of merchandise 24 containing a coded label 25 on one face thereof, for example, on the bottom, the item is moved manually or by suitable conveyor means across detector 23 and window 22. Light detector 23 is actuated by the tracking dot or bullseye portion of label 25 and the signal from this detector positions the tracking system to follow item 24 in its path across window 22. The path of item 24 is not critical, as the tracking system can follow the item across window 22 so long as there is a component of motion in the direction from right to left in the figure. During the tracking operation, the label is scanned by an optical scanner located beneath window 22 and the label data is decoded by suitable circuitry which provides output signals of a form suitable for subsequent data processing or for operating an output device such as a digital display or printer.

Figure 3:
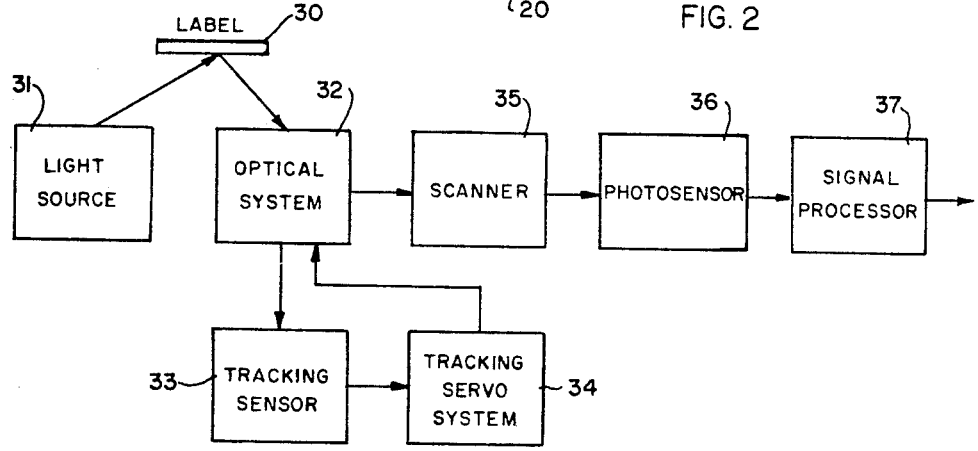
FIG. 3 is a block diagram of a label reading system according to the invention.

A block diagram representation of the tracking and scanning system is shown in FIG. 3. Label 30 is illuminated by a light source 31 and light reflected from label 30 is received by an optical system 32 which splits the reflected light into two paths. One beam of light from the optical system is received by a tracking sensor 33 which transduces this light signal into an electrical signal and applies it to a tracking servo system 34. The tracking servo system is mechanically linked to optical system 32 such that the system can be aligned on label 30 as it moves across the field of view in response to signals received from the tracking sensor 33. In this manner, the label is tracked in its path across the field of view so that the information can be read therefrom as the label moves. The second light beam produced by the optical system is circularly scanned by a label scanner 35 and the scanned light beam is received by a label sensor 36 which is operative to sense the light pulses from the coded indicia of label 30 and to transduce these light signals into electrical pulses which are applied to signal processor 37. The signal processor then decodes the information contained in the label and provides an output signal of a form suitable to operate an output device, for example, a digital display.

Figure 4:
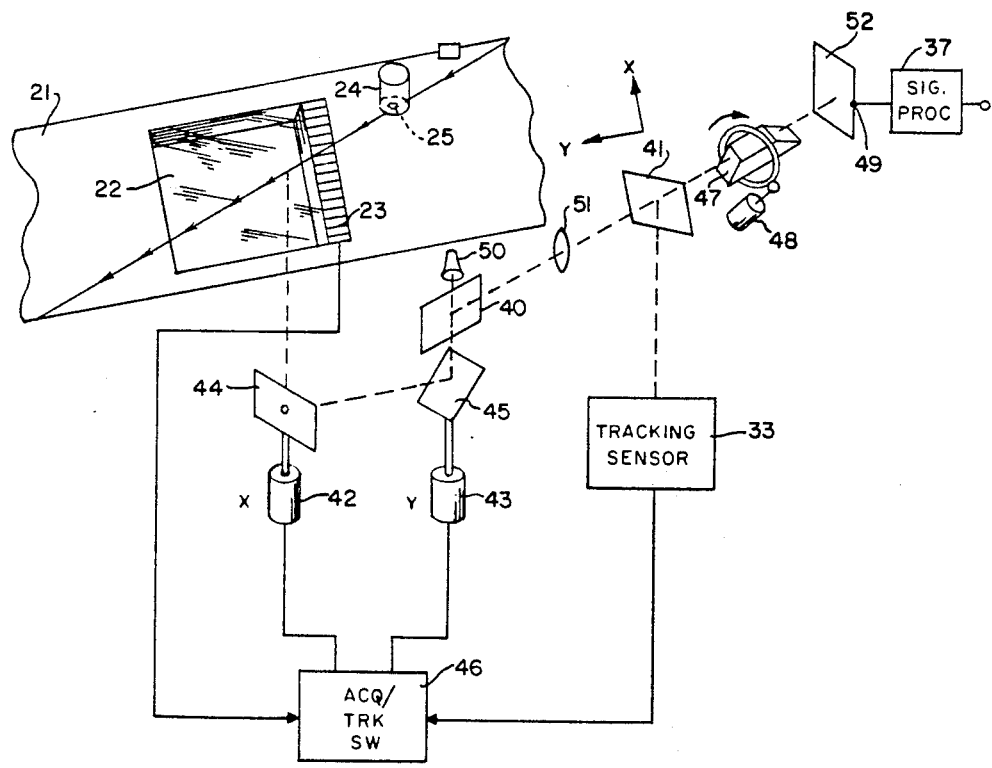
FIG. 4 is a schematic representation of a label reading system according to the invention.

The constituents of the tracking and scanning system are illustrated in more detail in FIG. 4. The optical system comprises partially silvered mirrors 40 and 41, and the tracking system includes tracking sensor 33, servo motors 42 and 43, mirrors 44 and 45 coupled to respective servos 42 and 43, and acquisition/track switch 46. The label scanner includes a dove prism 47 which is rotated about its optical axis by a motor 48 suitably linked to the prism. The label sensor is a single photodiode 49 located in the image plane of the label and positioned to receive the light reflected by the coded indicia on the label. This photodiode is connected to signal processor 37.

In operation, when the item of merchandise containing a label to be read passes over the light detector 23, a signal proportional to the x position of the label in the field of view is applied to acquisition/track switch 46 and thence to x servo 42 which positions mirror 44 to a position capable of receiving light reflected from the central dot of label 25. The y servo 43 positions mirror 45 such that it is initially aligned to intercept light from label 25 as it enters the field of view. Light from source 50 is transmitted through partially silvered mirror 40 and is directed to label 25 via tracking mirrors 44 and 45. Light reflected from this label is similarly reflected by mirrors 44 and 45 and is directed by mirror 40, lens 51 and mirror 41 to tracking sensor 33 which is operative to sense the position of the central dot of label 25 within the field of view and to produce a signal indicative of this position. The tracking signal is applied via acquisition/track switch 46 to x and y servos 42 and 43 which are operative to maintain mirrors 44 and 45 aligned on the moving label. A portion of the light reflected to the tracking sensor via partially reflective mirror 41 is also transmitted to rotating prism 47 which provides a rotating image of label 25 in image plane 52. Diode 49 located in the image plane and positioned to sense the variations in light caused by the image of the coded marks being scanned past the diode produces an electrical signal representative of these coded marks. This signal is next applied to signal processor 37 which decodes the data content of the label and provides signals of a form suitable for subsequent data processing or for operating an alpha-numeric display.

Figure 5:
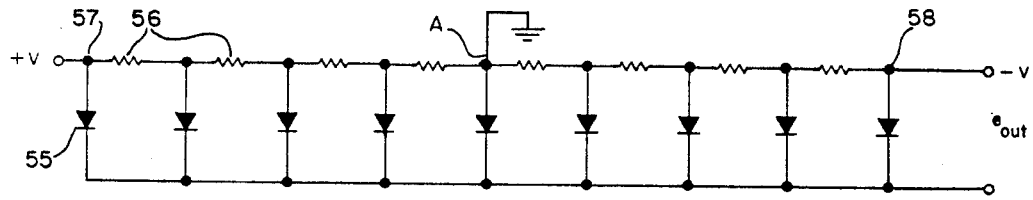
FIG. 5 is a schematic diagram of the elongated photosensor of FIG. 4.

Light detector 23 is shown schematically in FIG. 5 and consists of a plurality of photodiodes 55 having their cathodes connected to a common line and their anodes interconnected via resistors 56. A like number of resistors are connected on each side of a central point A which is connected to a source of reference potential, such as ground, and a positive and negative potential is applied to respective terminals 57 and 58 of the network. An output signal is taken from the common line and one end of the network, for example, terminal 58, as illustrated. It is evident that this network is essentially a voltage divider with zero voltage at the center and equal positive and negative voltages existing at like distances from the center point. When the diodes are nonconducting, a very high impedance exists across them and essentially no voltage appears at the output terminals. When, however, one of the plurality of diodes 55 conducts, a low resistance appears across the conducting diode which, in conjunction with certain of resistors 56, acts as a voltage divider which provides at its output terminals a voltage representative of the physical position of the diode along the length of the network. Since the network extends across the width of the viewing window, as illustrated in FIGS. 2 and 4, the voltage output of detector 23 is proportional to the x position of the tracking portion of the label within the viewing area, and this proportional voltage is employed to appropriately position the x servo.

Figure 6:
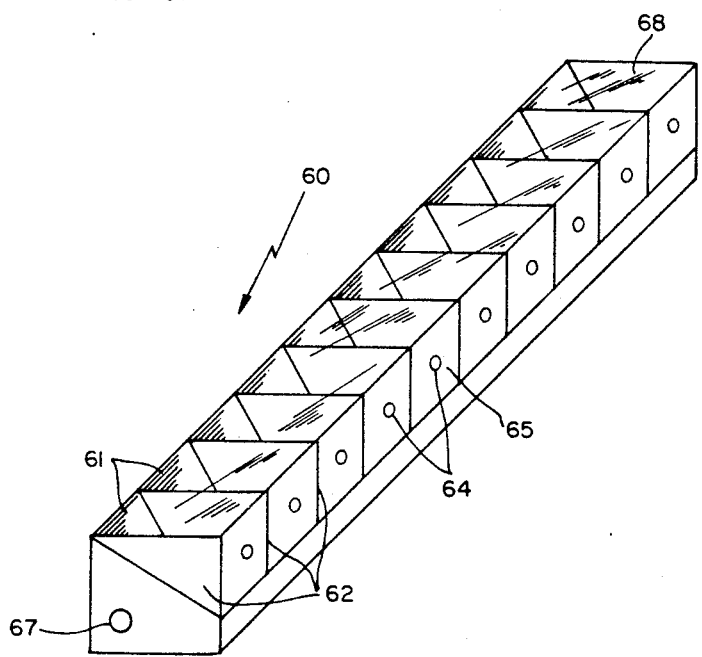
FIG. 6 is a pictorial representation of the elongated photosensor shown schematically in FIG. 5.

The physical arrangement of the light sensitive network 23 is shown somewhat diagrammatically, in FIG. 6. A plurality of transparent triangular sections 60 are provided each having a partially reflective surface 61 and opaque sides 62. These sections are disposed side by side with their opaque sides adjacent and each section has a light sensitive diode 64 attached to side 65 thereof. Resistors, not shown, are connected between the diodes, the center point of this resistor network being connected to ground and positive and negative potentials are respectively applied to each end of the resistive network, as illustrated in the schematic diagram of FIG. 5. An elongated light source 67, for example, a fluorescent tube, is disposed beneath partially mirrored surface 61 to illuminate the entire array of triangular sections. The transparent top of this array 68 is arranged flush with the countertop and adjacent to the viewing area, as in FIG. 4. In operation, light from source 67 passes through partially reflective surfaces 61 and is emitted from the transparent top 68 of the detector. When an item containing a label passes over this detector, light from one of the sections 60 illuminates the retroreflective tracking dot passing over this section and light is reflected from this dot into that particular section and is reflected by partially reflective surface 61 to photodiode 64 associated with that section. The illuminated photodiode conducts, causing a voltage to appear at the output terminals of the detector which is operative to drive the $x$ servo to a position in the viewing area which is proportional to the error voltage provided by detector 23. In this manner, the $x$ servo is initially positioned to acquire the moving label as it enters the scanning field.

Figure 7:
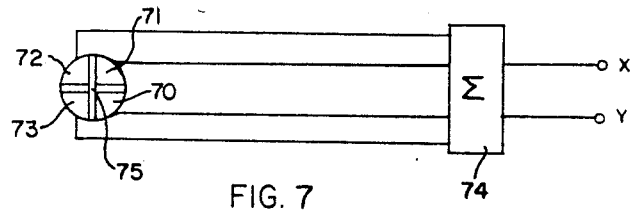
FIG. 7 is a diagrammatic representation of the tracking sensor of FIG. 4.

The tracking sensor is illustrated schematically in FIG. 7 and consists of four electrically insulated photoconductive sectors 70, 71, 72 and 73, each connected to a mixing network 74 having an $x$ output and a $y$ output. Such a sensor is well known in the automatic control field and is operative to generate a pair of signals which are representative of the positional error of a light source. In the present implementation, light reflected from the retroreflective dot on the label illuminates the segmented photocell. If the tracking mirrors 44 and 45 are appropriately positioned, light will impinge upon the photocell at the intersection 75 of the four segments and no error signal is generated in either axis. When, however, either the $x$ mirror or the $y$ mirror or both are not suitably centered on the moving label image, light from the retroreflective tracking dot impinges upon the photosensor in some position other than the common center, which causes a signal to be generated which is indicative of the positional error to be corrected by the servo system. For example, if light from the tracking dot illuminates sector 70, a signal is generated by this sector and is applied to network 74 which is operative to generate an $x$ signal and a $y$ signal which indicates that the servo system must direct its mirrors such that the light is directed back to the null position 75, central to the four sectors.

Figure 8:
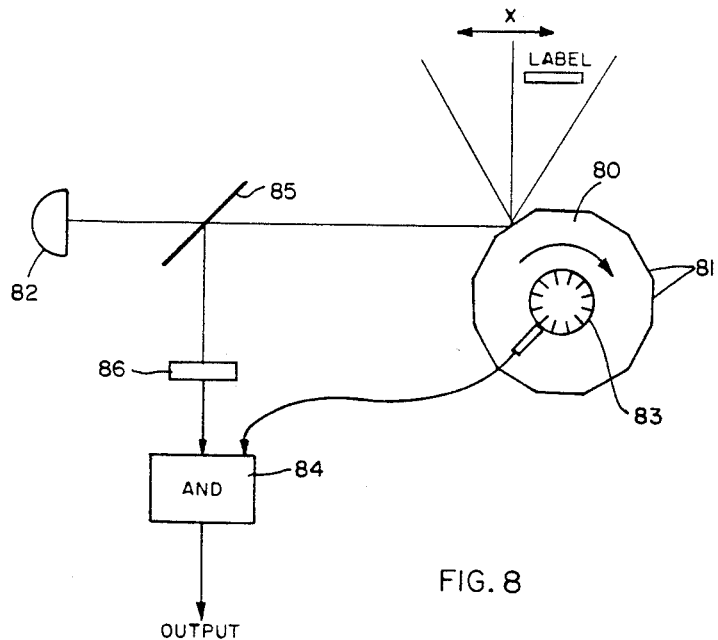
FIG. 8 is a schematic representation of an alternative acquisition detector useful in the invention.

An alternative to the elongated light detector used to determine the $x$ position of the label in the viewing area is illustrated in FIG. 8. A rotating wheel 80 having a plurality of mirrors 81 affixed to the periphery thereof causes a light beam from source 82 to be scanned across the $x$ direction of the viewing area. A commutator mechanism 8 is provided on the wheel 80 to provide a signal to an AND gate 84 which is indicative of the rotational position of the wheel. When a label appears in the view of the scanned light beam, light is reflected from the retroreflective tracking dot and is reflected by one of mirrors 81 to partially silvered mirror 85 and thence to a photocell 86, which produces an electrical signal which is applied to the second input of AND gate 84. The output of this AND gate is then a signal representing the angular position of wheel 80 and hence the position in the $x$ direction at which the dot was acquired. This signal is then employed to position the $x$ servo and its associated mirror on the label entering the field of view, in the same manner as discussed hereinabove.

The invention is not to be limited to that which has been particularly shown and described except as indicated in the appended claims.

What is claimed is:

1. A mark sensing system operative to read a label containing data circularly disposed therein comprising, a source of light for illuminating said label, means operative in response to light from a portion of said label to track said label as it moves across a field of view, scanning means operative to circularly scan light from said label, and a photosensitive detector operative to receive light from said label.

2. A system according to claim 1 in which said label has data encoded therein by coded indicia arranged in one or more annuli.

3. A system according to claim 1 in which the portion of said label operative to direct light to said tracking means is a retroflective dot located at the center of said circularly coded label.

4. A system according to claim 1 in which the portion of said label operative to direct light to said tracking means is a plurality of concentric rings optically differentiable from the background on which said rings are disposed.

5. A system according to claim 1 in which said tracking means includes a photosensor operative to produce a control signal in response to light received from a portion of said label, optical means operative to track said label, and a servo system operative in response to said control signal to position said optical means in light propagating relationship with said label.

6. A system according to claim 1 in which said tracking means includes first and second mirrors each rotatable about a respective orthogonal axis via respective first and second servo motors, a tracking photosensor operative in response to light received from a portion of said label to produce first and second control signals indicative of the positional error of said received light, and means for applying said first and second control signals to said respective first and second servo motors to rotate them to a position of optical alignment with said label.

7. A system according to claim 6 further including photosensitive means operative to detect the position of said label as it enters said field of view, and means responsive to signals from said photosensitive means to align said first mirror with said label.

No references cited.

RALPH G. NILSON, *Primary Examiner.*

MARTIN ABRAMSON, *Assistant Examiner.*